United States Patent [19]

Chaffee

[11] Patent Number: 5,267,363
[45] Date of Patent: Dec. 7, 1993

[54] PNEUMATIC SUPPORT SYSTEM

[76] Inventor: Robert B. Chaffee, 78 Montgomery St., Boston, Mass. 02116

[21] Appl. No.: 764,337

[22] Filed: Sep. 23, 1991

Related U.S. Application Data

[63] Continuation-in-part of Ser. No. 557,943, Jul. 25, 1990, abandoned, which is a continuation-in-part of Ser. No. 384,786, Jul. 25, 1989, Pat. No. 4,977,633.

[51] Int. Cl.$^5$ ............................................. A47C 21/08
[52] U.S. Cl. ......................................... 5/453; 5/449; 417/38; 417/44
[58] Field of Search .................... 5/449, 453, 469; 417/38, 44, 411, 423.7

[56] References Cited

U.S. PATENT DOCUMENTS

| | | | |
|---|---|---|---|
| 388,037 | 8/1988 | Hargin . | |
| 679,519 | 7/1901 | Smith . | |
| 918,391 | 4/1909 | Taard . | |
| 1,185,684 | 6/1916 | Kraft et al. . | |
| 1,263,599 | 4/1918 | Poole . | |
| 1,451,136 | 4/1923 | Allnutt . | |
| 1,944,466 | 1/1934 | Rubin | 5/343 |
| 2,059,226 | 6/1935 | Gates | 5/347 |
| 2,112,641 | 9/1936 | Wheaton | 277/61 |
| 2,369,736 | 2/1945 | Hurt | 5/343 |
| 2,372,218 | 7/1941 | Manson et al. | 5/348 |
| 2,415,150 | 2/1947 | Stein . | |
| 2,549,597 | 4/1951 | Harris et al. | 5/348 |
| 2,573,375 | 10/1951 | Winstead | 230/32 |
| 2,701,579 | 2/1955 | Hasselquist | 137/223 |
| 2,741,780 | 4/1956 | Kimbrig | 5/348 |
| 2,842,783 | 7/1958 | Druck | 5/348 |
| 3,042,941 | 7/1962 | Marcus | 5/348 |
| 3,066,323 | 12/1962 | Kintner | 5/334 |
| 3,068,494 | 12/1962 | Pinkwater | 5/348 |
| 3,099,386 | 7/1963 | Pieper | 417/411 X |
| 3,128,480 | 11/1962 | Lineback | 5/348 |
| 3,155,991 | 11/1964 | Dunham | 5/348 |
| 3,505,695 | 4/1970 | Bishaf et al. | 5/348 |
| 3,536,071 | 10/1970 | Ferrando | 128/142.5 |
| 3,563,676 | 2/1971 | Coovert et al. | 417/44 |
| 3,772,717 | 11/1973 | Yuen et al. | 5/349 |
| 3,785,395 | 1/1974 | Andreasson | 137/223 |
| 3,790,975 | 2/1974 | Philipp et al. | 5/349 |
| 3,798,686 | 3/1974 | Gaiser | 5/343 |
| 3,840,922 | 10/1974 | Morrison et al. | 5/350 |
| 3,864,766 | 2/1975 | Prete, Jr. | 5/337 |
| 3,877,092 | 4/1975 | Gaiser | 5/343 |
| 3,983,907 | 10/1976 | Sorensen | 137/223 |
| 3,995,653 | 12/1976 | Mackal et al. | 137/234 |
| 4,025,974 | 5/1977 | Lea et al. | 5/367 |
| 4,080,105 | 3/1978 | Connell | 417/38 X |
| 4,149,285 | 4/1979 | Stanton | 5/347 |
| 4,169,295 | 10/1979 | Darling | 5/450 |
| 4,176,681 | 12/1979 | Mackal | 137/516.29 |
| 4,371,999 | 2/1983 | Reid | 5/457 |
| 4,442,838 | 4/1984 | Samson et al. | 128/369 |
| 4,488,323 | 12/1984 | Colburn | 5/460 |
| 4,521,166 | 6/1985 | Phillips | 417/478 |
| 4,579,141 | 4/1986 | Arff | 137/223 |
| 4,644,597 | 2/1987 | Walker | 5/449 |
| 4,678,014 | 6/1987 | Owen et al. | 5/453 X |
| 4,737,017 | 3/1988 | Levin | 417/411 X |
| 4,766,628 | 8/1988 | Walker | 5/449 |
| 4,829,616 | 5/1989 | Walker | 5/453 |
| 4,862,533 | 9/1989 | Adams, III | 5/413 |
| 4,896,389 | 1/1990 | Chamberland | 5/453 |
| 4,897,890 | 2/1990 | Walker | 5/453 |
| 4,970,741 | 11/1990 | Spina | 5/417 |
| 4,977,633 | 12/1990 | Chaffee | 5/453 |
| 4,982,466 | 1/1991 | Higgins et al. | 5/453 |
| 5,052,894 | 10/1991 | Rimington | 417/44 |
| 5,068,933 | 12/1991 | Sexton | 5/453 X |
| 5,079,785 | 1/1992 | Garcia | 5/453 X |

*Primary Examiner*—Michael F. Trettel
*Attorney, Agent, or Firm*—Bromberg & Sunstein

[57] ABSTRACT

A portable, inflatable support system, and a portable inflator for use with such a system are provided in one embodiment. The inflatable support system may include an inflatable mattress having a pressure valve and a battery powered inflator for removable engagement therewith, which on engagement is automatically powered for a predetermined time or until a predetermined pressure is achieved. The mattress may be readily expanded for use and collapsed for storage. Another embodiment provides a multipurpose pressure control, for manual adjustment to provide an inflatable support system of desired firmness, and to modify the posture of the reclining user. Another embodiment provides an in-place bedding system, including a mattress, mattress cover, and top and bottom bedsheets, which retain their functional arrangement when the bed is collapsed for storage and prepared for use, thereby eliminating the necessity for re-making the bed with each use.

22 Claims, 9 Drawing Sheets

PNEUMATIC SUPPORT SYSTEM

CROSS REFERENCE TO RELATED APPLICATIONS

This application is a continuation-in-part of U.S. patent application Ser. No. 07/557,943, filed Jul. 25, 1990, now abandoned, which is a continuation-in-part of U.S. application Ser. No. 07/384,786, filed Jul. 25, 1989, now U.S. Pat. No. 4,977,633. These prior applications are hereby incorporated herein by reference.

TECHNICAL FIELD

The present invention relates to inflatable support systems, which may include air mattresses, and inflation and control thereof.

SUMMARY OF THE INVENTION

The invention provides in one embodiment a portable, inflatable support system, and a portable inflator for use with such a system. According to one embodiment of the invention, the inflatable support system may include an inflatable mattress having a pressure valve and a battery powered inflator for removable engagement therewith, which on engagement is automatically powered for a predetermined time or until a predetermined pressure is achieved. The mattress may be readily expanded for use and collapsed for storage.

In accordance with another embodiment of the invention, there is provided a multipurpose pressure control, for manual adjustment to provide an inflatable support system of desired firmness, and to modify the posture of the reclining user.

In accordance with another embodiment of the invention, there is provided an in-place bedding system, including a mattress, mattress cover, and top and bottom sheets, which retain their functional arrangement when the bed is collapsed for storage and prepared for use, thereby eliminating the necessity for re-making the bed with each use.

BRIEF DESCRIPTION OF THE DRAWINGS

The foregoing features of the invention will be more readily understood by reference to the following detailed description taken with the accompanying drawings, in which.

DETAILED DESCRIPTION OF SPECIFIC EMBODIMENTS

Figure 1:
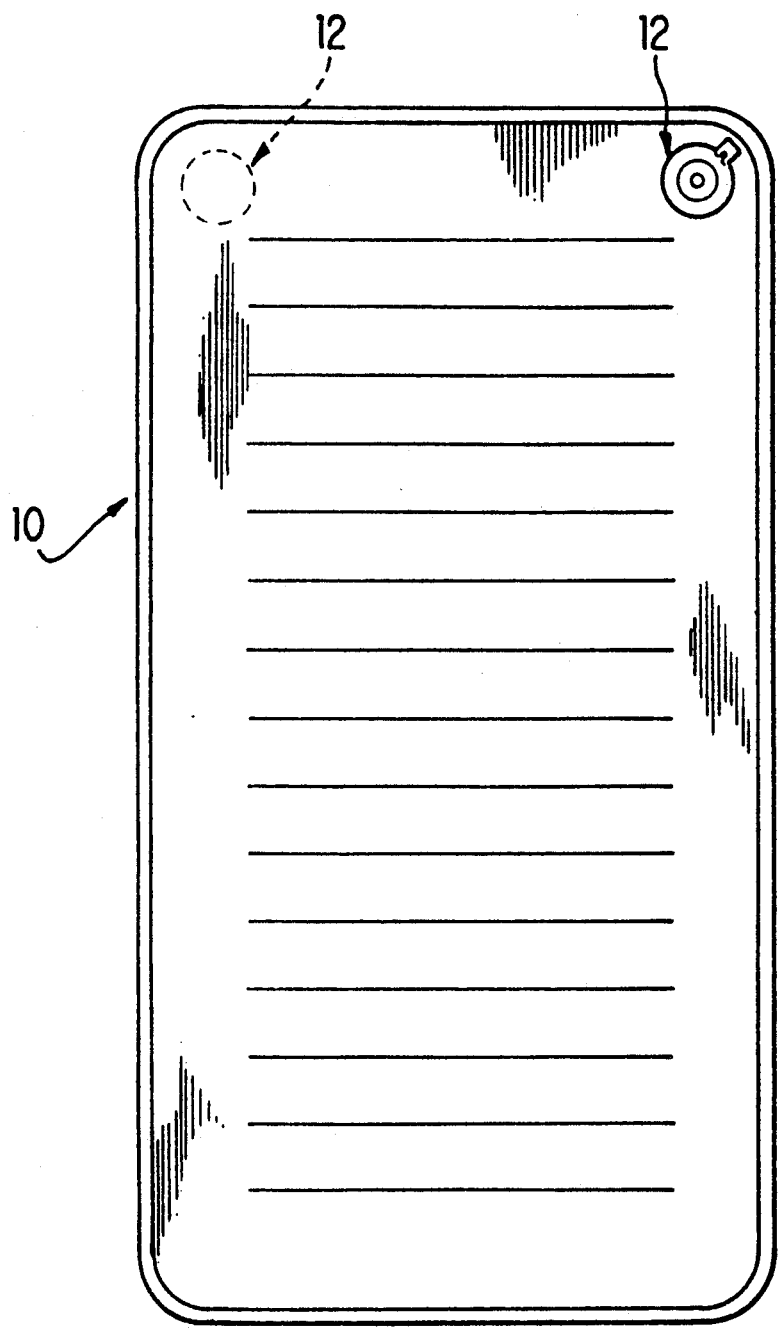
FIG. 1 illustrates an inflatable mattress in accordance with a preferred embodiment of the invention.

A first embodiment of the invention illustrated in FIG. 1 provides an inflatable support system including an inflatable mattress 10 having a dual valve assembly 12 affording support and comfort for the user. The mattress 10 additionally is conveniently and readily inflated and assembled or deflated and stored. Although in the examples that follow, it is assumed that inflation of the mattress is achieved using air, in fact any suitable fluid may be used for inflation, such as water or nitrogen, and if desired appropriate means may be supplied for collection or drainage of fluid expelled from the mattress in the course of adjustment or deflation for storage purposes.

Figure 2:
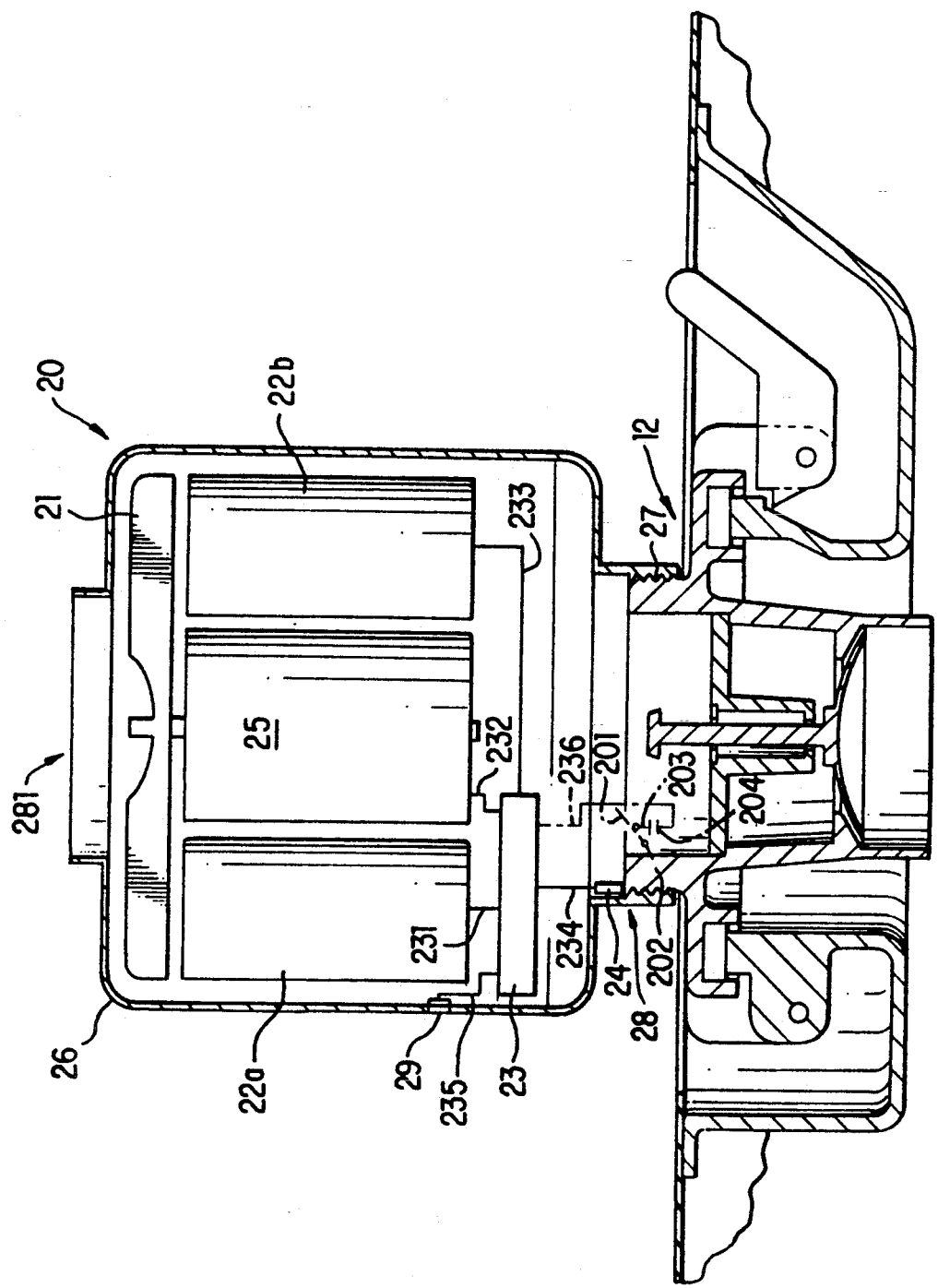
FIG. 2 illustrates a portable battery powered inflation device for use with the embodiment of FIG. 1.

In FIG. 2 is illustrated detail of the dual valve assembly 12 engaged with a portable battery powered inflation device 20 in accordance with a preferred embodiment of the invention. The inflation device includes a dc motor 25, powered by rechargeable batteries 22a and 22b, and an impeller 21 driven by the motor 25, all mounted in a housing 26 having a mouth region 28 that is removably engagable with the inflation input (discussed below in connection with FIG. 3 as item 322) of the dual valve 12. The method of engagement may be by screw threads 27 or by other suitable means known in the art, such as a bayonet mount permitting quick connection and disconnect. Also disposed in the housing 26 are control circuitry for controlling the motor, sensing arrangement 24 for sensing when the mouth 26 of the housing is engaged with the inflation input of the dual valve 12, and dc battery recharging input 29. The housing 26 may also be provided with a suitable arrangement for covering the mouth region 28 and the air inlet 281. Although numerous such arrangements are possible, one arrangement may include a snap-on C-shaped clip that is pivotally mounted along a vertical axis of the inflation device 20 of FIG. 2 to permit the clip to swing off the mouth 28 and the air inlet 281. The control circuitry 23 is connected to the batteries 22a and 22b over lines 231 and 233 respectively, to the motor 25 over line 232, to the sensing arrangement 24 over line 234, and to the recharging input 29 over line 235. The sensing arrangement may be a simple contact switch, mounted in the mouth 28, that is closed by motion of the threads of the inflation input when it is engaged with the mouth 28. Alternatively, for example, the sensing arrangement may be a Hall effect device mounted in the mouth 28 that is triggered by proximity to a magnet mounted in the inflation input.

The control circuitry 23 is configured, by means well known in the art, to deliver power to the motor 25 from the time that the sensing arrangement 24 has detected engagement of the mouth 26 with the inflation input of the dual valve 12. In this manner, pumping of air into the mattress begins only after, and as soon as, the inflation device 20 has been properly engaged. Similarly, the control circuitry is configured to cease delivering power when the inflation device 20 is no longer engaged, so that it may be easily turned on and off without the need for an external switch. When the inflation device 20 is engaged with the mattress, the control circuitry 23 continues to deliver power to the motor 25 until a predetermined condition has been achieved. In one version of this embodiment, the battery-motor-impeller combination is designed to provide a maximum air pressure that does not exceed the maximum desired pressure in the mattress. In such a case, for a mattress of a given size, once a predetermined time has elapsed for delivery of air to the mattress by the inflation device 20, the maximum desired pressure will have been reached. Accordingly, the control circuitry is designed to cease delivering power to the motor 25 when a predetermined time has elapsed after the sensing arrangement 24 has sensed engagement of the mouth 26 with the inflation input of the dual valve 12. With a typical air mattress and a typical design for an inflation device, for example, maximum pressure may be achieved in about one minute, so the control circuitry provides a timed shutoff after one minute. It is apparent that the timed shut-off feature provides desirable conservation of battery power, and conservation may be enhanced if shut-off occurs at full inflation—i.e. when the inflation device has first achieved the maximum pressure in the air mattress of which it is capable, assuming that this maximum does not exceed the maximum desired pressure in the mattress. Indeed, such an approach permits use of a relatively small and lightweight inflation device. If the user is prepared to provide manually (i.e., by blowing) the final bolus of air to achieve the desired pressure, the inflation device may be smaller still. Such a design spares the user of the time-consuming and headache-producing task of filling the mattress manually, while permitting a compact and lightweight construction for the inflation device 20.

Alternatively, the control may take advantage of the fact that air flow from the inflation device 20 to the inflation input of the dual valve 12 has substantially ceased when the maximum desired pressure has been reached, assuming that the battery-motor-impeller combination is designed to provide a maximum air pressure that does not exceed the maximum pressure in the mattress. In this alternative configuration, the inflation device 20 may be further provided with a flow sensor, and the control circuitry 23 may be configured to cease delivering power after substantial air flow has ceased. The flow sensor in such a configuration may be implemented by a vane (shown in phantom) 201 mounted on a pivot 202 and having an arm 203 that keeps a normally open microswitch (shown in phantom) 204 closed only as long as air flow is substantial, and the microswitch is connected to the control circuitry 23 over line 236. The control circuitry 23 is then configured to provide initial power to the motor 25 independently of the position of microswitch 204 until a period of time has elapsed to permit the establishment of initial flow to cause closure of the microswitch.

In a related alternative embodiment of the device 20 shown in FIG. 2, there may be provided a pressure transducer that is connected to the control circuitry 23, which may be configured to cease providing power to the motor 25 after a predetermined pressure has been reached.

Figure 3:
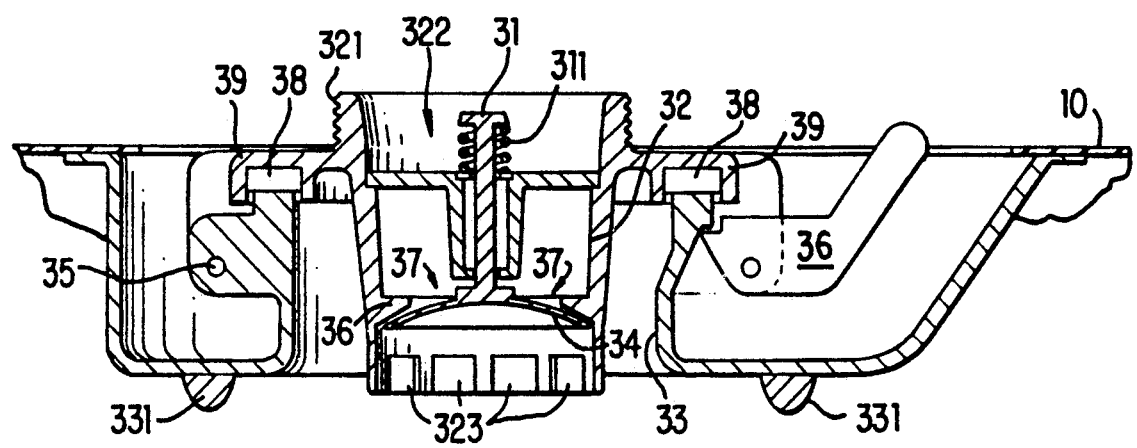
FIGS. 3 and 4 illustrate the dual valve assembly depicted in FIG. 2.
Figure 4:
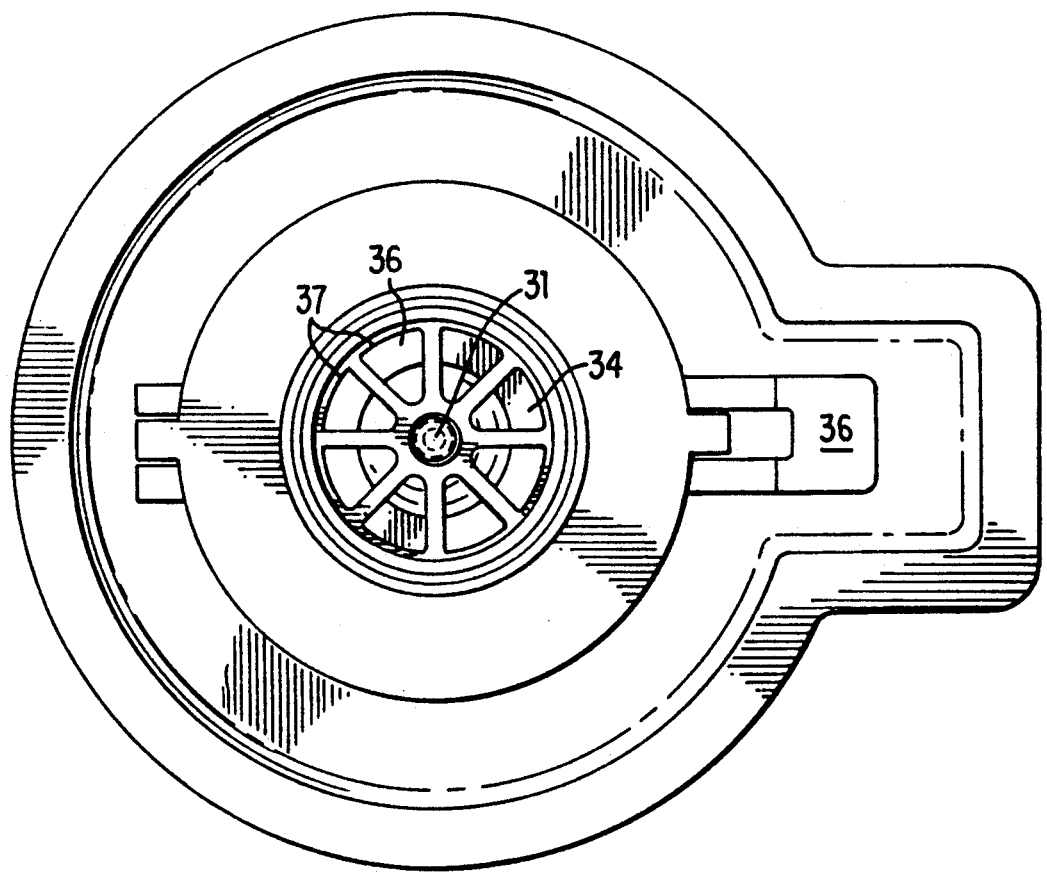

FIGS. 3 and 4 show a cross section and a top view respectively of the dual valve assembly depicted in FIG. 2. This valve assembly is similar to the valve assembly shown in FIGS. 11-13 of my prior U.S. application Ser. No. 07/557,943, filed Jul. 25, 1990. Inflation is provided to the mattress 10 by means of the inflation input 322 having exterior threads 321, which are capable of being engaged with mating threads of the inflation device 20 described above. As previously discussed, the means of achieving the engagement with the inflation device is a matter of design choice, and alternative embodiments, such as the use of a bayonet mount, are within the scope of the present invention. Air pressure at the inflation input 322 causes the downward displacement of diaphragm 34 away from its valve seat 36, thereby permitting air flow through the first cylinder 32 via the triangular passageways 37. When air has been placed within the mattress 10 under modest pressure, however, and air pressure is removed from inflation input 322, the pressure of air in the mattress 10 urges the diaphragm 34 against valve seat 36 and produces a positive seal against the exit of air from the mattress. An optional spring 311 may be used to assure a positive seal even in the absence of substantial pressure within the mattress 10. This seal can be momentarily overridden by pressing downwardly on stem 31, which causes the downward motion of the diaphragm away from the valve seat 36, and permitting the exit of controlled amounts of air through the passageways 37. Thus the valve design permits the reduction of air pressure in the mattress from any excess that may have occurred on inflation to a desired optimum pressure, simply by pressing on the stem 31. The quality of air released by the valve may be controlled by the distance the valve stem 31 is initially depressed (letting air pressure within the mattress 10 force the valve to return to a closed position); for example, a one-eigth inch depression provides a subtle decrease in pressure and a one-half inch depression a more substantial pressure drop. It should be pointed out that the valve described herein typically functions over a pressure range from approximately $\frac{1}{4}$ to 1 lb of pressure per square inch (2 to 7 kPa), a region in which it is typically difficult to achieve good control simultaneously with an effective seal. The diameter of first cylinder 32 is large enough (typically about 1.25 inches (3 cm) or more) to permit the rapid inflation of the mattress with a substantial flow of air at relatively low pressure.

The valve assembly just described, including first cylinder 32, diaphragm 34, and stem 31, is mounted concentrically within a second cylinder 33, and is itself hingedly mounted so as to cover the opening of the second cylinder 33. The opening is defined by rim 38, and against which is mated cover seal 39. The hinge pivot 35 permits the valve assembly to uncover the opening 33, which is large enough to permit the rapid and easy deflation of the mattress by expelling air through the opening of cylinder 33, which is typically about 2 inches (5 cm) or more. The opening of the cylinder 33 is sealed when the mattress is in use by latch 36, which is disposed on the opposite side of the assembly from pivot 35, and causes rim 38 to be hugged by cover seal 39. Although the embodiment illustrated herein shows the use of a hinge 35 and a latch 36, it may be seen that the valve assembly described previously may be secured to cover the second cylinder 33 by other means known in the art, including a bayonet mount that is secured after engagement by rotation. Alternatively there may be employed a combination bayonet-hinge assembly, configured so that after the bayonet is disengaged by counter-rotation, a pivot (similar to item 35, but carried on a short arcuate track mounted to the second cylinder so as to permit rotation of the bayonet) permits the valve assembly to uncover the opening defined by rim 38 in a manner similar to that described above.

In order to permit unrestricted air flow into (or out of) the air mattress when it is in a collapsed or near-collapsed condition, the housing for the second cylinder is provided with a plurality of stand-offs 331 that prevent the inner surface of mattress 10 from fully occluding the opening of the second cylinder 33 to the mattress interior. Similarly, a series of openings 323 in the inner extremity of the first cylinder 32 prevent the inner surface of mattress 10 from fully occluding the opening of the first cylinder to the mattress interior.

Figure 5:
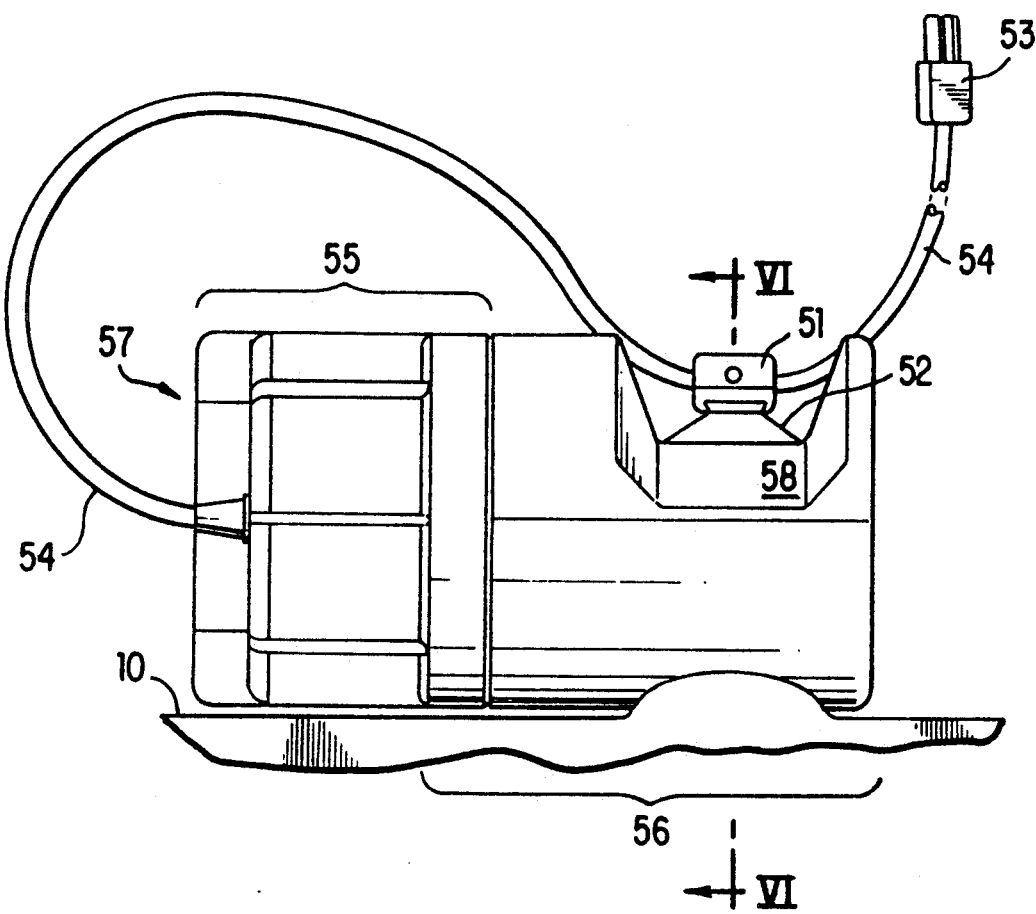
FIGS. 5 through 7 illustrate a multipurpose pressure control in accordance with another preferred embodiment of the invention.
Figure 6:
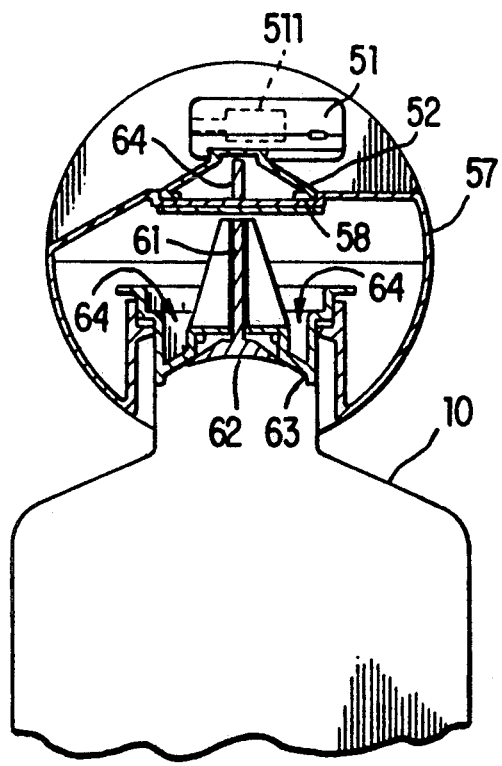
Figure 7:
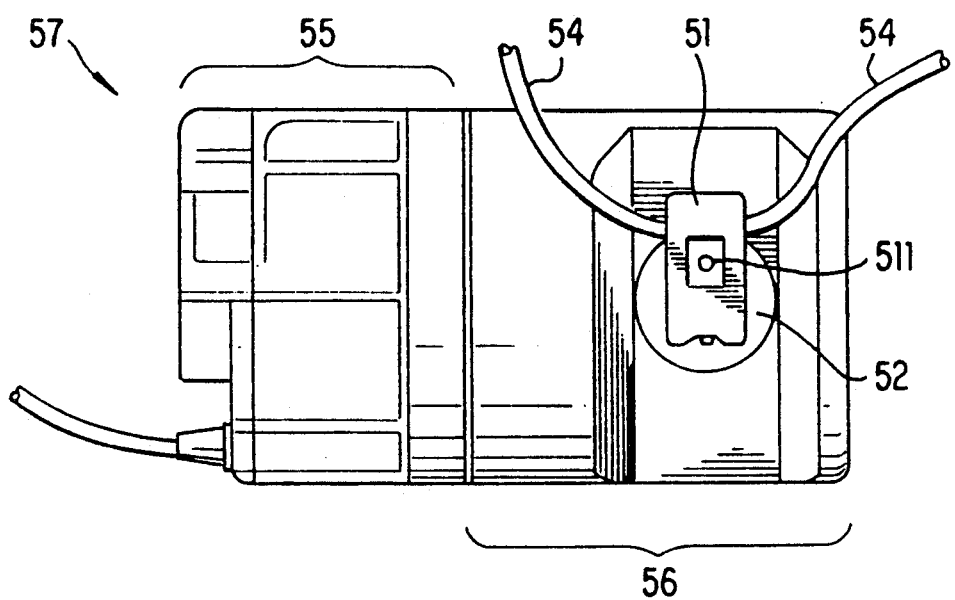

FIGS. 5 through 7 illustrate another preferred embodiment of the invention, in this case providing a multipurpose pressure control. FIG. 5 is a side view of the embodiment with the mattress 10 moved out of the way. FIG. 6 is a vertical section taken through plane VI—VI of FIG. 5, and FIG. 7 is a top view of the embodiment of FIG. 5. In this embodiment, in a manner similar to that of the embodiment of FIG. 1 of U.S. application Ser. No. 07/557,943, filed Jul. 25, 1990, a housing 57 contains a line-powered motor-driven fan to pump air into the mattress 10 and also serves as a mandrel upon which the deflated mattress may be wound; a large diameter valve at the foot of the mattress (not shown in these figures) may provide rapid deflation of the mattress. Power is supplied via plug 53, line cord 54 and a switch contained in assembly 51. Region 55 of the housing 57 contains a motor and fan to provide air pressure to inflate the mattress 10. The motor and fan may be designed, as described above, in connection with FIG. 2, to provide a maximum air pressure that does not exceed the maximum desired pressure in the mattress and may employ control circuitry of the type described above to turn off the motor once a desired pressure has been reached. Region 56 of the housing contains a one-way valve, similar to the valve assembly associated with the first cylinder 32 described in relation to FIGS. 3 and 4 above. Recessed in the top of switch assembly 51 is switch button 511 for turning on the fan motor. Normally switch assembly 51 is unmounted and moves freely as part of line cord 54. Thus, when the unit is plugged in and the switch in assembly 51 is turned on, the mattress is inflated and unwinds from the housing 57. After the mattress is inflated, the switch assembly 51 may then be placed in removable engagement with receptacle 58 on housing 57.

Receptacle 58 is formed on a flexible membrane forming at this point the exterior of housing 57 and disposed over stem 61 (corresponding to stem 31 of FIG. 3) associated with diaphragm 62 (corresponding to diaphragm 34 of FIG. 3). The walls of cylinder 63 (corresponding to cylinder 32 of FIG. 3) are attached on the outside to air mattress 10, and define an opening 64 through which air from the fan is pumped when the fan motor is energized. The housing 57 is removably engaged with the walls of cylinder 63, permitting replacement of the air mattress 10 or motor fan unit if one of them fails.

It can be seen that pressing button 511 causes the fan motor to run and increases pressure in the mattress. Similarly, moving the entire assembly 51 in a downward direction causes force to be transmitted, through rod 64 and walls 52 of the assembly 51, and the flexible membrane of receptacle 58, to the stem 61 of the valve, causing diaphragm 62 to let air out of the mattress. This embodiment therefore provides an easily operable multipurpose pressure control that in a first position causes air pressure in the mattress to increase and in a second position causes air pressure in the mattress to decrease. Because the housing 57 and related fittings are disposed at an end of the mattress 10, the control may be suitably located and reached at the head of the mattress, and is therefore accessible to a user while on the mattress. The multipurpose pressure control consequently permits the user to adjust the mattress air pressure for the user's personal comfort while on the mattress and without interruption of body contact with the mattress. As pressure adjustments may occur during the night, in darkness, with the user in a semi-awake, semi-conscious state, the control may be operated without vision, excessive manipulation, or major changes in posture. It should be noted that this embodiment permits both gross and subtle adjustments in mattress air pressure, thereby providing a sleep surface which accommodates a wide variety of comfort requirements. Additionally, in connection with embodiments, such as described in connection with FIG. 1 of my application Ser. No. 07/557,943, filed Jul. 25, 1990, wherein the motor-driven fan assembly lies at the head of the mattress, motion of assembly 51 can be used to partially deflate the mattress to permit the user to recline, while using the motor-driven fan assembly to support a pillow; such a position is comfortable for reading and the like. At low inflations, the mattress may still provide complete suspension of the body, while also providing a difference in the range of 6–8 inches (15–20 cm) in elevation between feet and torso.

Although the embodiment described in connection with FIGS. 5–7 uses a mixed mechanical and electrical system, it would be possible to use a control that is entirely actuated electronically, for example, employing a solenoid to move the valve stem 61 to open the diaphragm 62, and a three position switch that in a first position energizes the fan motor, in a second position energizes the solenoid, and in a third position energizes neither. Additionally, it is within the scope of the invention to provide a control that causes a predetermined increment of inflation or deflation in accordance with a user's selection. The increment may be determined, for example, by a timing device or a pressure measurement device.

The pneumatic support system of the present invention offers space-saving and time-saving advantages in comparison to prior art portable or temporary bed arrangements. In its fully expanded "in-use" state, the pneumatic support system herein occupies the same amount of space as a conventional mattress. Yet in a collapsed "storage" state, the support system returns almost 90% of that space to the user. In order for the user to fully realize the benefits of this advantage, the support system must allow the transition to and from storage to occur with maximum efficiency and ease. With the support system in accordance with the present invention, set-up and take-down require as little as 15 to 30 seconds.

In order to take full advantage of the utility offered by the support system in accordance with the present invention, a special bedding system is advantageous. When conventional covers and bedsheets are used with the present invention, they may become misaligned as it is being moved to and from storage, requiring that the support system be made over with bedding with each use. Since the movement in and out of storage may often occur on a daily basis, considerable time and effort are lost through the requirement to re-make. The in-place bedding system of the present invention eliminates the problem of bedding misalignment.

FIGS. 8–14 pertain to the in-place bedding system of the present invention. The in-pace bedding system includes a special mattress cover that permits use of a conventional fitted bottom bedsheet and a conventional top bedsheet, which will retain their functional relationships not only while in use, but also during and after the collapsing of support system for storage thereby eliminating the necessity for re-making the bed with each use.

Figure 8:
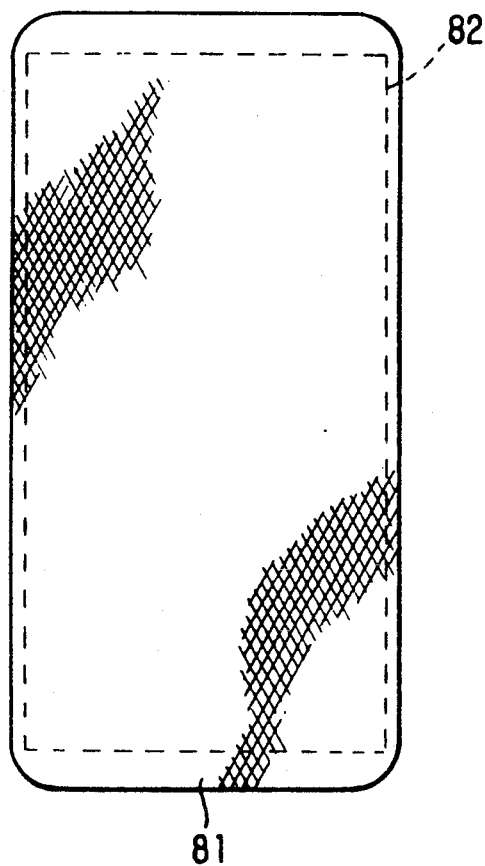
FIGS. 8–10 illustrate an in-place bedding system in accordance with another preferred embodiment of the invention, and a mattress cover used in connection herewith.

The exterior of the mattress cover 81, shown in FIG. 8 in a top view, much like a fitted bedsheet, wraps around all four sides of the mattress. The cover assembly includes a padding material 82 sewn to the underside of the cover's top surface. This material may be foam rubber, synthetic fiber, a combination thereof, or other suitable material.

Figure 9:
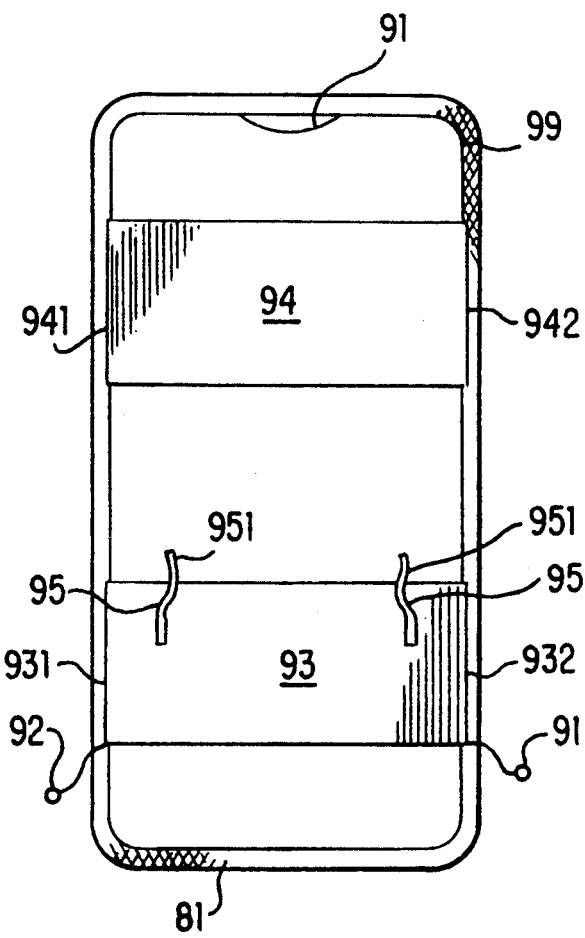
Figure 10:
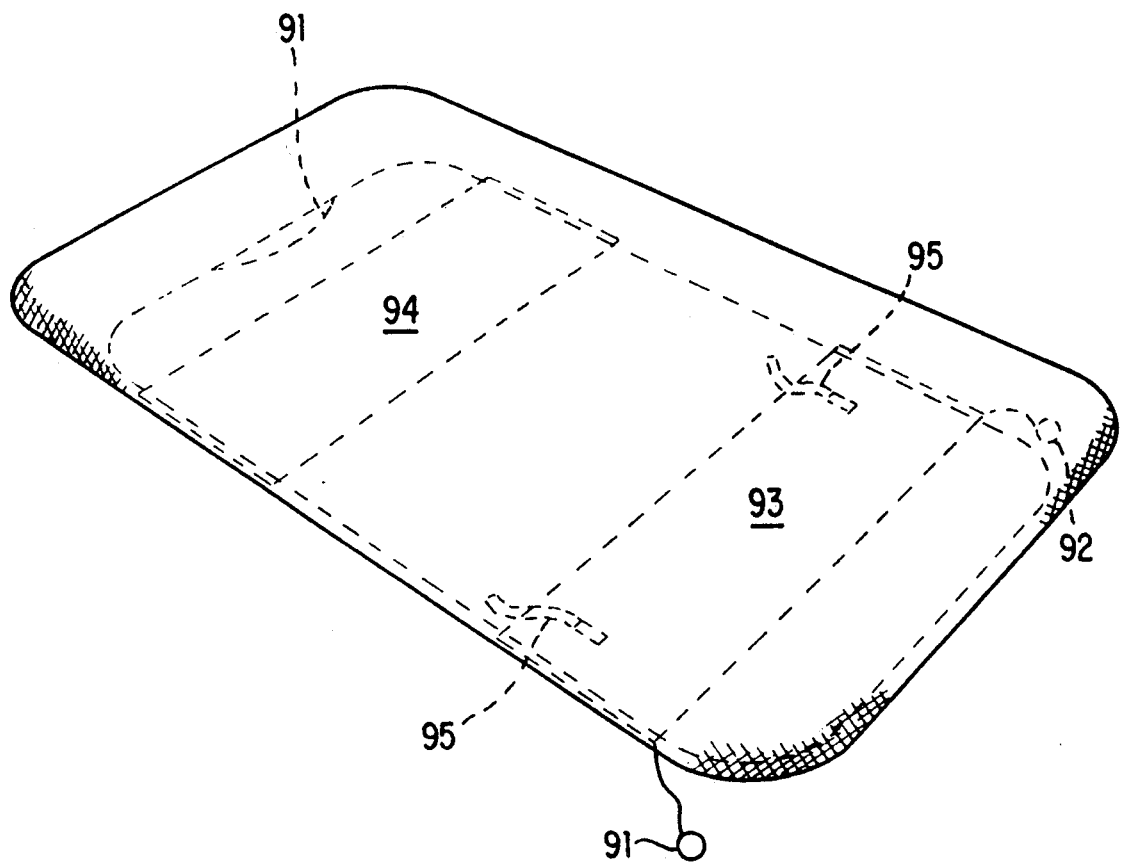

In FIG. 9 is shown a bottom view of the cover 81, which includes two cross-connectors 93 and 94 sewn to the bottom edges of the cover at positions 941 and 942 for connector 94 and 931 and 932 for connector 93. The cross-connectors 93 and 94 span the mattress bottom from side to side, securing the position of the mattress cover for multiple re-use (repeated cycles of inflation and deflation). On both sides of the cover, near the foot end, are sheet retainer rings 91 and 92, attached to the cover by elastic straps. These retainer rings, discussed in further detail in connection with FIGS. 11-14, have the purpose of securing the position of a conventional top sheet for multiple re-use while, at the same time, allowing the flexibility and movement necessary for comfortable sleeping. Controller strap 91 runs around the inner periphery 99 of the cover 81 and is pulled and tightened in a manner known in the art to assure that the cover 81 tightly hugs the mattress. A pair of roll straps 95 are attached at one end to connector 93. When the mattress and mattress cover are rolled up as an assembled unit (possibly using the housing of a motor-driven fan as a mandrel in the fashion described in connection with FIG. 5, and possibly including top and bottom bedsheets as described below), the other end of each of roll strap 95 may be passed through the open region 117 near the ear 111 (see FIG. 11) of a corresponding retaining ring 91 or 92 and thereafter attached to itself via Velcro or similar hook-and-loop type fastening material. In this way, the rolled up assembly may be maintained in a compact condition and easily readied for reuse in accordance with procedures described above. FIG. 10 is a perspective view from above of the general features described in connection with FIG. 9.

Initial set-up of the support system in accordance with FIGS. 8-10 includes the following:

1. Insertion of the deflated mattress into the mattress cover 81.
2. Inflation of the mattress while checking for proper alignment of mattress and cover.
3. Installation of the bottom bedsheet (a standard fitted sheet).
4. Installation of the top bedsheet by laying it on the inflated bed and then drawing the two corners of the sheet through the bedsheet at its foot-end retainer rings 91 and 92, so that the bedsheet has a reasonably snug fit, conforming to the foot-end of the mattress.

Once these steps are taken, mattress, mattress cover, bottom bedsheet, and top bedsheet become a semi-permanent assembly, fixed in position for multiple re-use.

Figure 13:
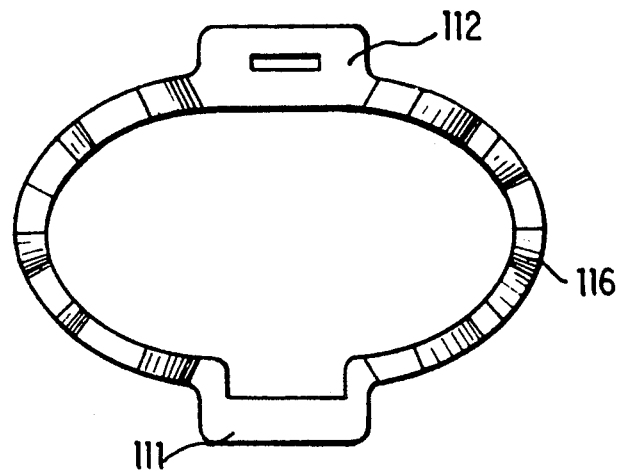
FIGS. 11–14 provide detail of the sheet retainer rings shown in FIGS. 9 and 10.
Figure 11:
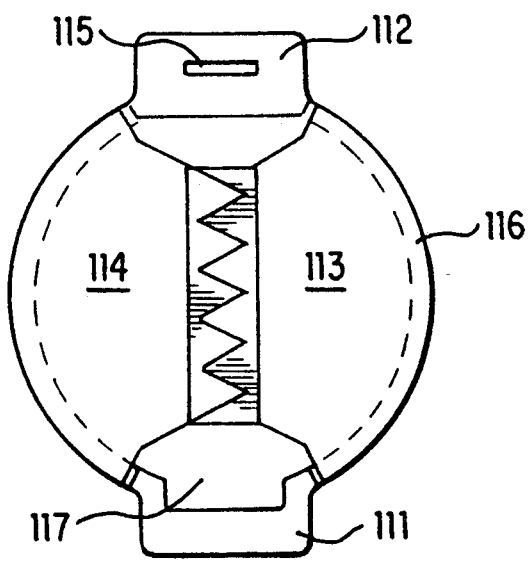
Figure 14:
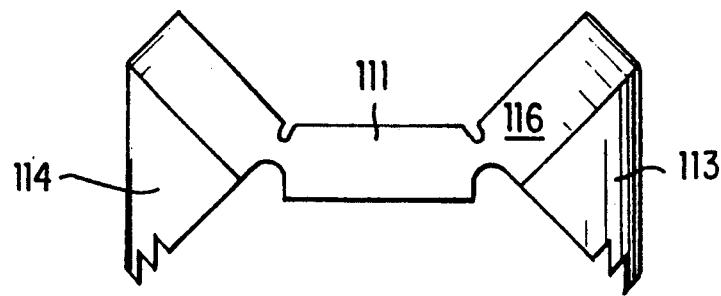
Figure 12:
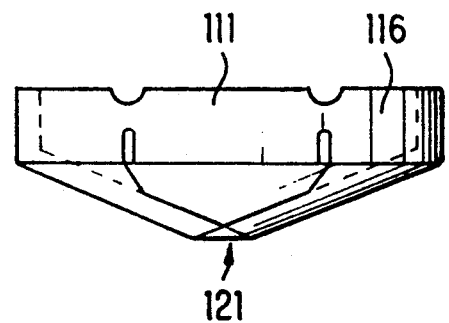

Detail of the retainer rings 91 and 92 is provided in FIGS. 11-14. The retainer ring is a spring fastener, and may be fabricated from a variety of resilient materials including various plastics, such as polyethylene. FIGS. 11 and 12 provide side and top views of the retainer ring, which include slot 115 for attachment to the strap and ears 111 and 112. When ears 111 and 112 are squeezed toward one another, the peripheral wall 116 is deformed, as shown in FIG. 13 (also presenting a top view) and jaws 114 and 113 are caused to open, as shown in FIG. 14 (presenting a side view). FIG. 12 shows the region 121 wherein the teeth of the jaws 113 and 114 are engaged with one another when the ears are not squeezed together. In this embodiment, the peripheral wall, the jaws, and the ears are all formed as part of an integral structure.

Squeezing ears 111 and 112 toward one another allows insertion of the corner of the bedsheet through the jaws 114 and 113 of the ring. The top bedsheet corner may then be easily drawn though the ring to achieve proper fitting of the bedsheet to the bed. Once the sheet is in position (and the squeezing of the ears is released), the spring action of the ring applies pressure to the jaws and in turn on the inserted bedsheet portion, locking the inserted portion of the bedsheet in place, and securing the position of the sheet on the bed. For bedsheet removal, one merely squeezes together the ears 111 and 112 of the ring, and the bedsheet is automatically released.

The retainer ring provides convenience and ease in the use of conventional bedsheets for initially setting-up the bed, for changing bedsheets, and for providing a fixed bedding assembly that eliminates the need for re-making the bed with each use.

Although the foregoing embodiment has been described as a mattress cover, the essential features of the foregoing cover may be directly incorporated into the surface of the mattress. The padding material 82 may then be attached to the top surface of the mattress, provided with a suitable covering layer.

What is claimed is:

1. An inflatable support system, comprising:
   an inflatable body support having a pressure valve in fluid communication with an inflation input;
   inflation means, for inflating the body support with a fluid, that is removably engagable with the inflation input;
   sensing means, for sensing the engagement of the inflation means with the inflation input;
   control means, in communication with the sensing means and the inflation means, for automatically powering the inflation means when the sensing means senses the engagement of the inflation means; and
   housing means for housing the inflation means, the sensing means, and the control means in a single assembly.

2. A system according to claim 1, wherein the control means includes means for automatically powering the inflation means until a predetermined condition is achieved.

3. A system according to claim 2, wherein
   the inflation means includes a battery, an electric motor powered by the battery, and an impeller; and
   the control means includes means for powering the motor for a predetermined time after the sensing means senses engagement of the inflation means.

4. A system according to claim 2, wherein
   the inflation means includes a battery, an electric motor powered by the battery, and an impeller; and
   the control means includes means for powering the motor until fluid pressure in the housing has reached a predetermined limit.

5. A system according to claim 2, wherein
   the inflation means includes a battery, an electric motor powered by the battery, and an impeller, the inflation means being capable of producing a fluid pressure at a maximum limit not exceeding a desired maximum fluid pressure in the body support; and the control means includes means for powering the motor until fluid flow caused by action of the impeller has substantially ceased as a result of the attainment by the inflation means of the maximum fluid pressure limit.

6. A system according to claim 5, wherein the control means includes means for powering the motor for a predetermined time after the sensing means senses engagement of the inflation means.

7. A system according to claim 5, wherein the control means includes means for sensing the presence of substantial fluid flow caused by action of the impeller.

8. A system according to claim 1, wherein
the inflation means includes a battery, an electric motor powered by the battery, and an impeller; and
the control means includes means for powering the motor for a predetermined time after the sensing means senses engagement of the inflation means.

9. A system according to claim 1, wherein the inflation means is capable of producing fluid pressure at a maximum fluid pressure in the body support.

10. A system according to claim 1, wherein the sensing means includes a switch actuated by engagement of the inflation means with the inflation input.

11. An inflation device, for inflating with fluid a body support that has an inflation input and that is removably engagable with the device in a manner that the fluid input is in substantial fluid communication with the device when engaged with it, the device comprising:
inflation means for providing fluid for inflating the body support;
connection means for removably connecting the inflation means to the inflation input;
sensing means, for sensing the positive engagement of the inflation device with the inflation input in substantial fluid communication with the device;
control means, in communication with the sensing means and the inflation means, for automatically powering the inflation means as soon as the sensing means senses the sealing engagement of the inflation device until a predetermined condition is achieved; and
housing means for housing the inflation means, the connection means, the sensing means, and the control means in a single assembly.

12. A device according to claim 11, wherein
the inflation means includes a battery, an electric motor powered by the battery, and an impeller; and
the control means includes means for powering the motor until fluid pressure in the housing has reached a predetermined limit.

13. A device according to claim 11, wherein
the inflation means includes a battery, an electric motor powered by the battery, and an impeller, the inflation means being capable of producing a fluid pressure at a maximum limit not exceeding a desired maximum fluid pressure in the body support; and
the control means includes means for powering the motor until fluid flow caused by action of the impeller has substantially ceased as a result of the attainment by the inflation means of the maximum fluid pressure limit.

14. A device according to claim 11, wherein the sensing means includes a switch actuated by engagement of the inflation device with the inflation input.

15. An inflation device, for inflating with fluid a body support that is removably engagable with the device and that has an inflation input, the device comprising:
inflation means for providing fluid for inflating the body support;
connection means for removably connecting the inflation means to the inflation input;
sensing means, for sensing the engagement of the inflation device with the inflation input;
control means, in communication with the sensing means and the inflation means, for automatically powering the inflation means when the sensing means senses the engagement of the inflation device until a predetermined condition is achieved; and
housing means for housing the inflation means, the connection means, the sensing means, and the control means in a single assembly; wherein the inflation means includes a battery, an electric motor powered by the battery, and an impeller; and
the control means includes means for powering the motor for a predetermined time after the sensing means senses engagement of the inflation device.

16. A device according to claim 15, wherein the inflation means is capable of producing fluid pressure at a maximum limit not exceeding a desired maximum fluid pressure in the body support.

17. An inflatable support system, comprising:
an inflatable bladder in fluid communication with an inflation input;
inflation means, for inflating the bladder with a fluid, in fluid communication with the inflation input, the inflation means including an electric motor and an impeller;
exhaust means for deflating the bladder including a valve having a stem to trigger deflation;
comfort control means, having a user input with a plurality of positions, in control communication with the inflation means and the exhaust means, for causing, in a first position of the user input, the inflation means to inflate the bladder and, in a second position of the user input, the exhaust means to deflate the bladder, such comfort control means including (i) a switch, removably incorporated in the control means to control power to the motor, that is closed in the first position and (ii) means for moving the valve stem in the second position; and
a switch housing for housing the switch, such housing being removably attachable to the comfort means and when so attached being mechanically linked to the valve stem, so that gross motion of the housing may constitute moving the user input into the second position and local movement of the switch within the housing may constitute moving the user input into the first position.

18. An inflatable support system, comprising:
an inflatable body support having a pressure valve in fluid communication with an inflation input; and
inflation means, for inflating the body support with a fluid, that is removably engagable with the inflation input, the inflation means including a battery, an electric motor powered by the battery, and an impeller, all disposed in a single housing;
mounting means, associated with at least one of the body support and the inflation means, for removably mounting the inflation means to the inflatable body support when the inflation means is engaged with the inflation input, so that inflation of the body support may be achieved without manual intervention once the inflation means has been so engaged.

19. An inflation device, for inflating with fluid a body support that is removably engagable with the device and that has a suitably configured inflation input, the device comprising:

inflation means for providing fluid for inflating the body support, the inflation means including a battery, an electric motor powered by the battery, and an impeller;

connection means for removably connecting the inflation means to the inflation input;

housing means for housing the inflation means and the connection means in a single assembly;

mounting means, affixed to the housing means and associated with the connection means, for removably mounting the inflation means to the body support at the inflation input when the inflation means is engaged with the inflation input, so that inflation of the body support may be achieved without manual intervention once the inflation means has been so engaged.

20. An inflatable support system, comprising:

an inflatable bladder having a one-way valve in fluid communication with an inflation input, such valve having a stem to trigger deflation;

inflation means, for inflating the bladder with a fluid, in fluid communication with the inflation input, the inflation means including an electric motor, an impeller and a switch;

comfort control means, having a user input with a plurality of positions, in control communication with the inflation means and the exhaust means, for, in a first position of the user input, actuating the switch to cause the inflation means to inflate the bladder and, in a second position of the user input, moving the stem to trigger deflation of the bladder.

21. A method of inflating a body support, having a suitably configured inflation input, the method comprising:

(a) providing a device having
  (i) inflation means for providing fluid for inflating the body support;
  (ii) connection means for removably connecting the inflation means to the inflation input;
  (iii) sensing means, for sensing the engagement of the inflation device with the inflation input;
  (iv) control means, in communication with the sensing means and the inflation means, for automatically powering the inflation means when the sensing means senses the positive engagement of the inflation device; and
  (v) housing means for housing the inflation means, the connection means, the sensing means, and the control means in a single assembly; and (b) engaging the device with the inflation input.

22. A method according to claim 21, wherein the sensing means includes a switch actuated by engagement of the inflation device with the inflation input.

* * * * *